June 4, 1929.  G. A. STACKHOUSE  1,716,093
HELICAL COIL SPRING ASSEMBLING, CUTTING, AND HOOK FORMING MACHINE
Filed Dec. 1, 1926  5 Sheets-Sheet 3

INVENTOR.
George A. Stackhouse.
BY Townsend Loftus
and Abbett
ATTORNEYS.

June 4, 1929.  G. A. STACKHOUSE  1,716,093
HELICAL COIL SPRING ASSEMBLING, CUTTING, AND HOOK FORMING MACHINE
Filed Dec. 1, 1926   5 Sheets-Sheet 4

INVENTOR.
George A. Stackhouse.
BY Townsend Loftus
and Abbett
ATTORNEYS.

Patented June 4, 1929.

1,716,093

UNITED STATES PATENT OFFICE.

GEORGE A. STACKHOUSE, OF OAKLAND, CALIFORNIA, ASSIGNOR TO THE L. A. YOUNG INDUSTRIES, INC., OF DETROIT, MICHIGAN, A CORPORATION OF MICHIGAN.

HELICAL-COIL-SPRING ASSEMBLING, CUTTING, AND HOOK-FORMING MACHINE.

Application filed December 1, 1926. Serial No. 151,846.

This invention relates to a machine whereby helical coil springs are automatically assembled in cross-shape formation, cut to proper length and hooks formed on the ends.

The object of the present invention is to provide a machine whereby helical coil springs may be automatically assembled in cross-shape formation, automatically cut off to a uniform length and hooks automatically bent or formed on the ends of the springs and further to provide a machine of the character referred to which may be operated in conjunction with the standard form of helical coiling machine.

One form which the machine may assume is shown by way of illustration in the accompanying drawings in which.

Figure 1:
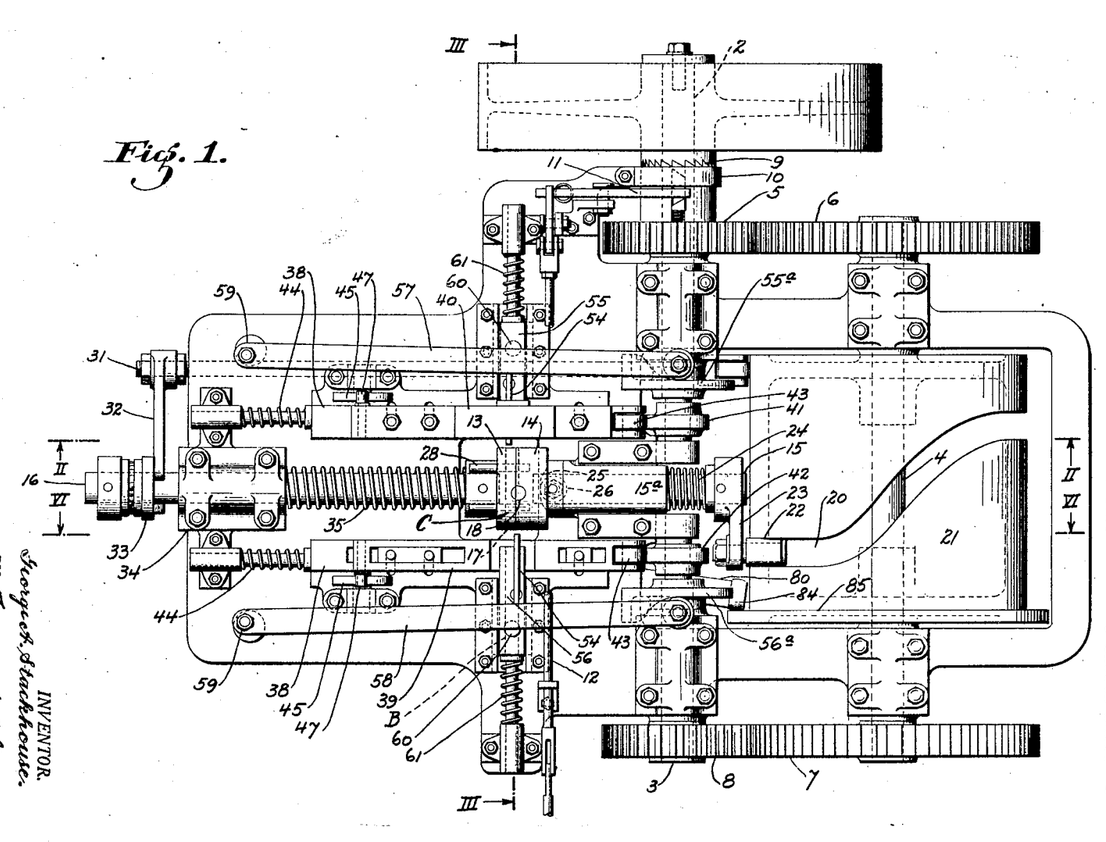
Figure 1 is a plan view of the machine.

Referring to the drawings in detail and particularly Figure 1, A indicates a main frame of suitable construction, in which are journaled a primary driving shaft 2, a secondary driving shaft 3 and an intermediate driving shaft 4. The shaft 4 is driven from the primary driving shaft 2, through spur gears such as indicated at 5 and 6 and the secondary driving shaft 3 is driven from the intermediate shaft 4 through gears 7 and 8. The gear ratio of the gears 5, 6, 7 and 8 is that of one to two.

The shafts 2 and 3 are, accordingly, driven in unison and at the same speed, while the intermediate shaft 4 is driven at half speed. Mounted on the primary driving shaft 2 is a jaw clutch 9 of standard construction and also mounted on the shaft is a friction brake 10 of standard construction. The primary and secondary driving shafts, together with the intermediate shaft are intermittently rotated during the operation of the machine. The shafts 2 and 3 being rotated only one revolution for each operation and the shaft 4 a half revolution for each operation. The jaw clutch 9 is actuated through a trip lever 11 (see Figures 1 and 3), and the trip lever is, in turn, actuated from a standard form of helical coiling machine through means of an actuating rod 12.

Figures 3, 4, 5:
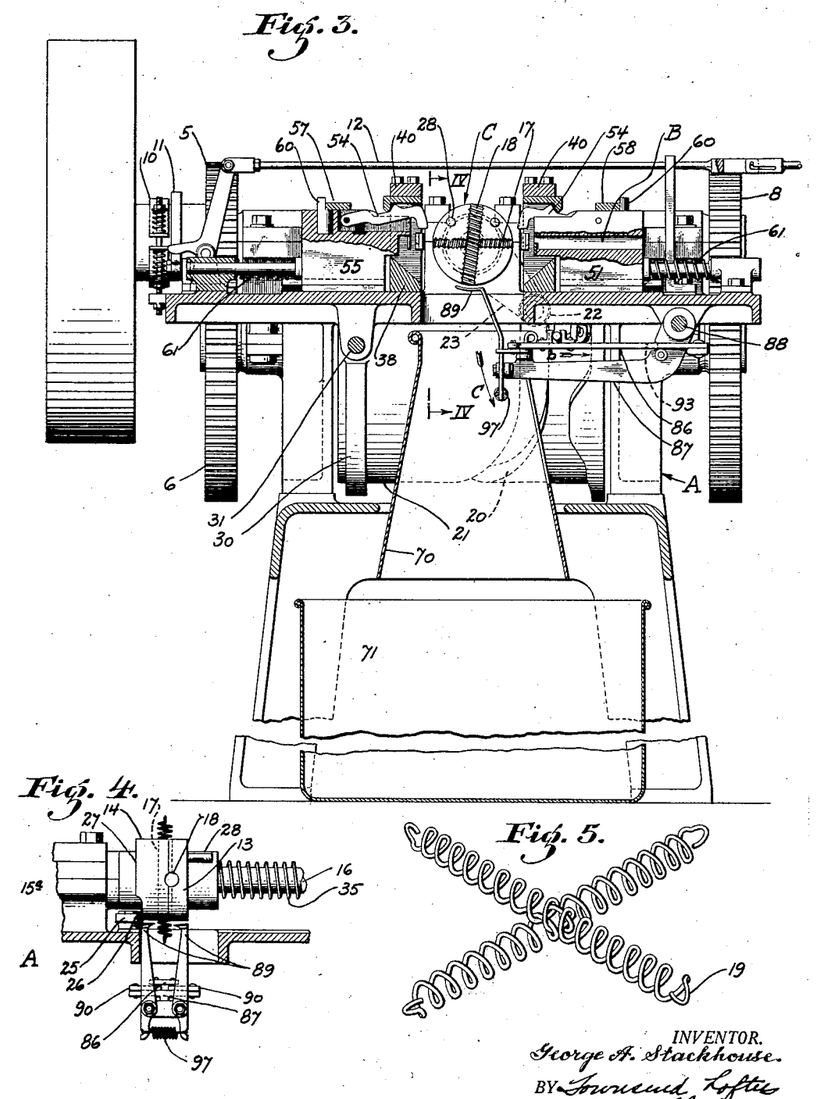
Figure 3 is a vertical cross section taken on the line III—III of Figure 1.
Figure 4 is a detail view of the spring ejector.
Figure 5 is a perspective view of the springs as assembled and with the hooks formed on the respective ends.

The product produced by the machine is the crossed helical spring shown in Figure 5. The coil from which the cross spring is formed is produced as a continuous coil in a standard helical coiler and is fed to the machine shown in this application through the feed opening generally indicated at B (see Figure 3). Practically all of the helical coilers are operated intermittently, that is the machine is set to produce a coil of a predetermined length. When this coil is formed, the coiler is automatically stopped and a cutter is automatically actuated to cut the coil. In the present instance, where a standard helical coiler is employed, the cutting mechanism is removed so as to permit the wire in a continuous coil to be fed to the feed opening B. The mechanism which would normally operate the cut-off mechanism of the helical coiler is, in this instance, connected with the rod 12 and as this is connected with the trip lever 11, its function will be that of automatically engaging and disengaging the jaw clutch once each revolution of the drive shafts 2 and 3.

The wire or helical coil formed by the automatic coiler and fed through the opening B is delivered to a chuck generally indicated at C (see Figures 1 and 3). This chuck consists of two sections 13 and 14 which are carried by the respective shafts shown at 15 and 16. The two halves of the chuck are provided with intersecting openings 17 and 18 which are slightly offset with relation to each other, but nevertheless, intersect. The helical coil is fed through opening B first into the transverse opening 17 of the chuck. The coil is then cut off to proper length and the chuck is rotated slightly less than a quarter revolution so that the transverse opening 18 will align with the feed opening B. The second coil is then fed from the feed opening B through transverse opening C into the chuck and this coil is also cut off. The two helical coils are in this manner crossed and assembled as shown in Figure 5 and hooks such as indicated at 19 are formed on the respective ends, all of which will later be described.

The shaft 15 carrying the chuck section 14 is mounted in the bearing 15$^a$ and it is adapted to oscillate in this bearing and it also has a slight longitudinal movement. The oscillating movement is transmitted through a cam groove 20 formed in a cam drum 21 which is secured to the intermediate drive shaft 4. The movement of the cam being transmitted to the shaft 15 through a roller 22 and a rocker arm 23 which is secured on the end of the shaft 15. A spring 24 is interposed between the rocker arm and the end of the bearing 15$^a$ and this spring serves the function of maintaining the chuck section 14 in engagement with a roller 25. This roller is shown in dotted lines in Figure 1 and in full lines in Figure 4. The roller is journaled on the main frame A and is stationary.

The rear face of the chuck section 14 is recessed as at 26 and as such is the case, the chuck 14 together with the shaft 15 will move in one direction when the roller 25 engages the recess and in the opposite direction when the roller engages the rear face shown at 27. This slight longitudinal movement of the chuck is necessary, due to the fact that the transverse openings in the chuck are slightly offset.

The roller 25 registers with the recess 26 when the opening 18 registers with the feed opening B and the roller engages the rear face 27 of the chuck when the opening 17 in the chuck is to be brought into registry. It might also be stated that offsetting of the transverse openings 17 and 18 in the chuck is necessary as it would, otherwise, become impossible to thread one coil through the other as shown in Figure 5. In other words, threading or assembling of one coil with relation to the other is due to the offset of the transverse openings and as the feed opening remains stationary, it is obviously necessary to move the chuck longitudinally so that first one opening will register and secondly the next opening.

The chuck section 14 carries two or more pins as shown at 28. The chuck section 13 is slidable on these pins and the pins furthermore serve the function of rotating or oscillating the chuck section 13 in unison with the chuck section 14. This is essential as the oscillating movement is transmitted through the rocker arm 23 and the shaft 15.

The shaft 16 will, of course, also oscillate, but its function is that of imparting a second movement to the chuck, that of separating the chuck section 13 with relation to the chuck section 14 when a cross spring has been asssembled and completed so as to permit automatic discharge of the completed product when the coils have been assembled and the hooks formed on the ends.

This separate movement of the chuck section 13 is independent of the slight longitudinal movement imparted through the roller 25 and in fact greater as the chucks must be considerably separated to permit free removal of the springs when assembled. This movement is imparted through a cam 30 fixed on one end of the drum 21. The cam 30 engages a pusher rod 31. A forked arm 32 is secured on the opposite end of this rod and this fork engages a collar 33 on the shaft 16. Engagement of the cam 30 with the pusher rod 31 thus forces the shaft 16 and chuck section 13 longitudinally in a direction away from the chuck section 14 and the movement imparted is sufficient to permit a free discharge of the assembled spring.

The shaft 16 is supported in a journal member 34 and it should be noted that a spring 35 surrounds the shaft and is interposed between the bearing 34 and chuck member 13. This spring serves two functions, first that of holding the chuck sections in closed position and secondly that of holding the pusher rod 31 in engagement with its cam 30.

In actual operation it will be assumed that the automatic coiler is forming a continuous helical coil and that the end thereof is passing through the feed opening B and into the transverse opening 17 of the chuck. When the end of the helical coil reaches the opposite end of the transverse opening in the chuck the automatic coiler is stopped and the rod 12 is operated to cause engagement of the jaw clutch 9. Such engagement causes rotation of the shafts 2 and 3 that is the jaw clutch remains in engagement only a sufficient length of time to permit one revolution of the shafts 2 and 3 and a half revolution of the shaft 4.

The clutch is then automatically disengaged by the rod 12 which is oscillated by the automatic coiler and the continuous coil is again advanced and fed through the transverse opening 18. A number of operations, however, take place before the chuck is rotated a quarter revolution to receive the second coil spring and this will be explained as follows:—

With the chuck in the position shown in Figure 3, and the transverse opening 17 aligning with the feed opening B and with the coil spring fed through the opening 17, it is first necessary to cut off the ends of the coil spring so as to obtain the uniform length and it is secondly necessary to bend the ends of the spring to form the hooks indicated at 19 (see Figure 5). After the coil has been cut and the hooks formed, the chuck sections are rotated a quarter revolution and the transverse opening 18 is then brought into alignment with the feed opening B. In other words, during a single revolution of the shafts 2, 3 and 4, the following operations take place.

The coil feed through the transverse opening 17 of the chuck is cut off to the proper length, the ends are bent to form the hooks 19 and the chuck is rotated substantially a quarter revolution to bring the transverse opening 18 into alignment with the feed opening B. The shafts 2, 3 and 4 stop the moment this has been accomplished and the coil from the automatic coiler is then advanced through the transverse opening 18. The coiler stops the moment this has been accomplished and, at the same time, operates the clutch 9 to again rotate the shafts as previously described, that is, the shafts 2 and 3 rotate one revolution and the shaft 4 a half revolution.

During this rotation of the two shafts and the half revolution of one shaft, the second coil spring delivered to the chuck is cut off to the proper length, the hooks are bent on the ends, the chuck sections are separated to discharge the complete and assembled cross spring, the chuck sections are returned and the chuck is again rotated a quarter revolution to bring the transverse opening 17 into alignment with the feed opening B, this being all accomplished during the second revolution of the shafts 2 and 3 and during the final half revolution of the shaft 4.

Figure 16:
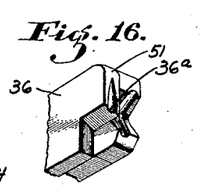
Figures 16 and 17 are perspective views of the ends of the respective cutters.
Figure 17:
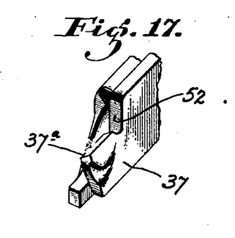

The operation of the cutting mechanism will first be described. The cutter consists of two blades such as shown at 36 and 37. The cutting point of the blade 36 is indicated at 36ª and the cutting point of the blade 37 at 37ª (see Figures 12, 16 and 17). The blade 37 is mounted in a carriage 38 (see Figures 1 and 2), and the blade 36 in the carriage 39. These carriages are reciprocally mounted on the main frame and they are mounted to move in opposite directions during the cutting operation. The carriage 39 is supported on the carriage 38 and the two carriages are held to the main frame by a bearing block 40. There are two bearing blocks and two sets of carriages, but as they are identical in construction and operation, the description of one should suffice.

The reciprocally mounted carriages are mounted on opposite sides of the chuck and the shafts 15 and 16 supporting the same and they are operated by individual cams indicated at 41 and 42. The cam 41 is secured to the shaft 2 and the cam 42 on the shaft 3. These cams are identical in shape and function with relation to the respective carriages in the same manner and the description of one should, accordingly, suffice.

Figure 2:
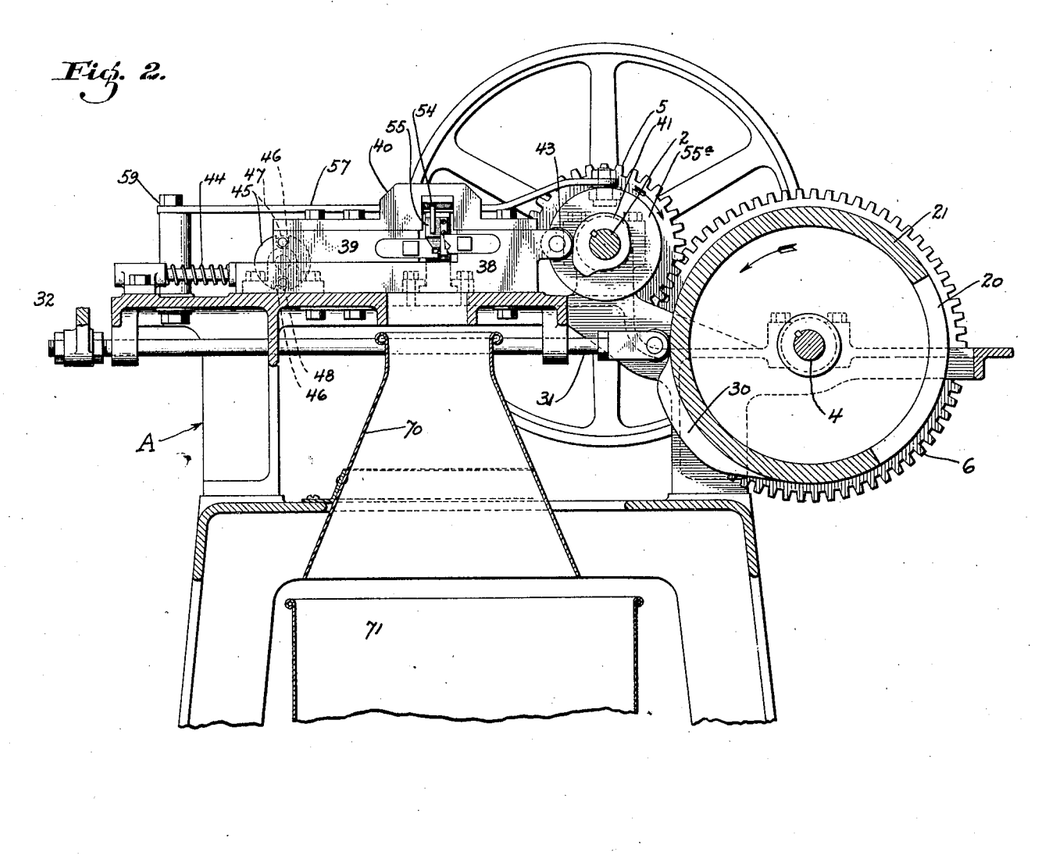
Figure 2 is a central vertical longitudinal section of the machine taken on the line II—II of Figure 1.

By referring to Figure 2, it will be noted that the carriage 38 is provided with a roller 43 on one end. This is engaged by the cam 41 and as such imparts a reciprocal movement to the carriage 38 in one direction, the return movement of the carriage being insured by a compression spring 44. Reverse movement is transmitted to the carriage 39 through a disc 45, which disc is shown in full lines in Figure 1 and in dotted lines in Figure 2. The opposite sides of the disc is slotted as at 46. A pin 47 carried by the carriage 39 enters the upper slot of the disc and a pin 48 secured to the lower carriage enters the lower slot. The disc 45, in other words, serves the function of a central pivot lever and thereby transfers reverse movement to the carriage 39 and the cutting knives 36 and 37 are thus moved towards each other each time the carriage 38 is actuated by the cam 41 and as both carriages and cutters are operated by their individual cams 41 and 42 and, at the same time, both ends of a coiled spring will be cut in unison. The cutting knives are, of course, placed at the respective ends of the transverse opening in the chuck which happens to align and as the cams 41 and 42 are so positioned that the knives are reciprocated when the coil has been fed through, the cutting operation of the coil to the proper length is the first operation which takes place.

The cutting knives form a second function substantially simultaneous with the cutting operation, to-wit: that of bending the ends of the cut coil inwardly as shown at 50 (see Figure 13), that is, the cut ends of the coil are engaged by the end faces 51 and 52 of the respective knives and the cut ends are thus bent inwardly as shown at 50. These ends are then bent at right angles to the coil or, in other words bent to a position to lie parallel with the longitudinal axis of the coil and hooks are thus formed at the respective ends of each coil.

Figure 8:
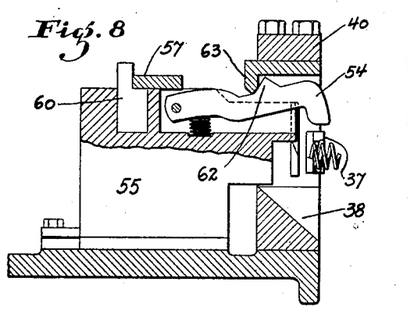
Figure 12:
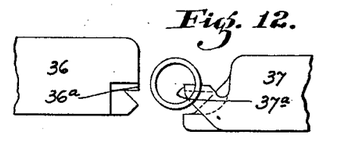
Figures 12, 13, 14 and 15 are enlarged detail views showing different positions assumed by the cutters.
Figure 13:
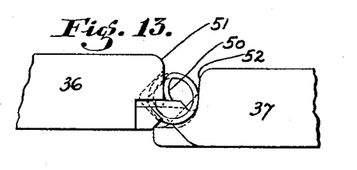
Figure 14:
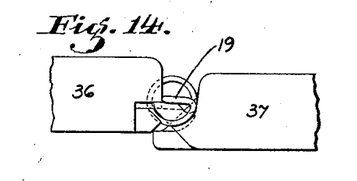
Figure 15:
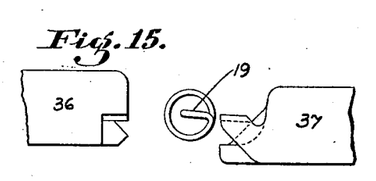

During the cutting operation, the knives move from the position shown in Figure 12 to the position shown in Figure 13. The ends of the coil are cut between the points 36ª and 37ª and the cut ends are simultaneously bent by the end faces 51 and 52. The cutting knives remain in this position while the bent end 50 is bent at right angles. The bending of the ends 50 at right angles is accomplished by means of a bending lever or hooker, generally indicated at 54, (see Figures 1, 2 and 8). These hookers are identical in construction there being two employed. They are mounted in carriages such as indicated at 55 and 56 which are positioned on opposite sides of the chuck. The hookers are operated from the main driving shafts 2 and 3 through cams 55ª and 56ª. These cams are secured on the respective shafts and rotate in unison with the same, in a manner similar to the cams 41 and 42.

A pair of levers 57 and 58 are pivotally mounted as at 59 on the respective sides of the machine. The forward ends of these levers are provided with rollers which engage the respective cams 55ª and 56ª. The carriages 55 and 56 are provided with upwardly projecting pins such as shown at 60. These pins are engaged by the levers when they are swung about their pivotal connection through means of the rollers and cams and the carriages are thereby forced in an outward direction, the carriages being returned by means of compression springs as indicated at 61.

The outward movement of the carriages takes place immediately after the cutting and bending of the ends of the coil spring and this reciprocal movement of the carriages is transmitted to depress the bending levers or hookers 54, there being one lever on each carriage.

Figure 9:
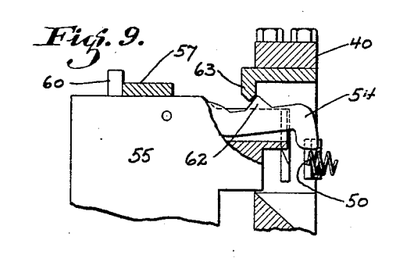
Figure 10:
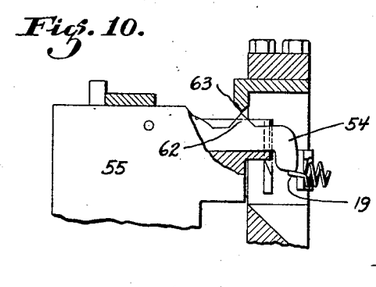
Figure 11:
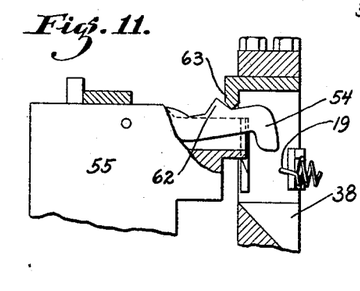

During outward movement of the carriage 55 (see Figure 8), a cam 62 on the bending lever 54 engages a lug 63 on the main frame. The bending lever is thus depressed and during its depressing movement it engages the bent portion 50 of the end of the spring and thus flattens it out at right angles or to a position where it will lie parallel with relation to the longitudinal axis of the coil spring. The travel of the carriage 55 is such that the cam 62 will clear the lug 63 (see Figures 10 and 11) and the respective ends of the coil spring are thus completely released. The cut end and bent end of the coil spring is plainly shown at 50 (see Figure 9). The bending of the cut and bent end to form the right angular hook 19 is plainly shown in Figure 10 and the release and withdrawal of the bending lever 54 is shown in Figure 11. At this time the first coil spring of the assembly is completed and the chuck is rotated a quarter revolution to bring the second transverse opening 18 into alignment with the feed opening B. This completes the first revolution of the shafts 2 and 3 and the first half revolution of the shaft 4. The clutch 9 is disengaged at this time, and the automatic coiler is again started to feed the second section of the coil spring through the opening B and the transverse opening 18 of the chuck. The coiler is again automatically stopped the moment the coil has been fed through the chuck and the clutch 9 is engaged and shafts 2 and 3 start their second revolution and the shaft 4 the last half of its first revolution. During the second revolution of the shafts 2 and 3 the following operations take place.

First the cutters are reciprocated to cut the ends of the second coil spring. Secondly and substantially simultaneous therewith the cut ends of the coil spring are bent as shown at 50 (see Figure 13.) Third the hookers 54 are thrown into operation and the bent ends 50 are flattened out to form hooks 19. At this point the crossed spring is completely assembled and the hooks are formed on the respective ends of the springs. It is thus ready to be discharged and it is, accordingly, necessary to open the chucks, this being accomplished by the action of the cam 30. This is the fourth operation and is accomplished by the action of the cam 30.

The spreading of the chucks permits the assembled spring to drop by gravity through a chute 70 and into a receptacle 71 provided for their reception. Gravity removal is, however, not depended upon, as an extractor is employed to insure a positive removal of the same, as will hereinafter be described. The chucks are closed by the action of the spring 35 when the cross spring is removed and the fifth and final operation then takes place, to-wit, that of rotating the chuck to normal position, or in other words, to a position where the transverse opening 17 aligns with the feed opening B. At this point the second revolution of the shafts 2 and 3 is completed and so is the second half revolution of the shaft 4. The clutch 9 is disengaged at this time and the coiler is again automatically started to feed a new section of spring through the transverse opening 17 of the chuck.

The shafts 2, 3 and 4, accordingly, remain stationary when the coiler is feeding and they rotate when the coiler is stationary. The rotary movement being transmitted through the several cams to perform the different operations described. The extractor is, perhaps, best illustrated in Figures 3, 4 6 and 7. It consists of a horizontally disposed arm 80 pivotally mounted on the main frame as at 81. One end of the lever is provided with a pivot 82 which carries a vertically movable arm 83. The opposite end of the lever 80 is provided with a roller 84 and this is adapted to be engaged by a cam 85 formed on the drum 21. This cam engages the roller 84 during the last part of the revolution of the shaft 4 and the drum and as such rocks the lever 80 in a horizontal direction indicated by the arrow a.

Figure 6:
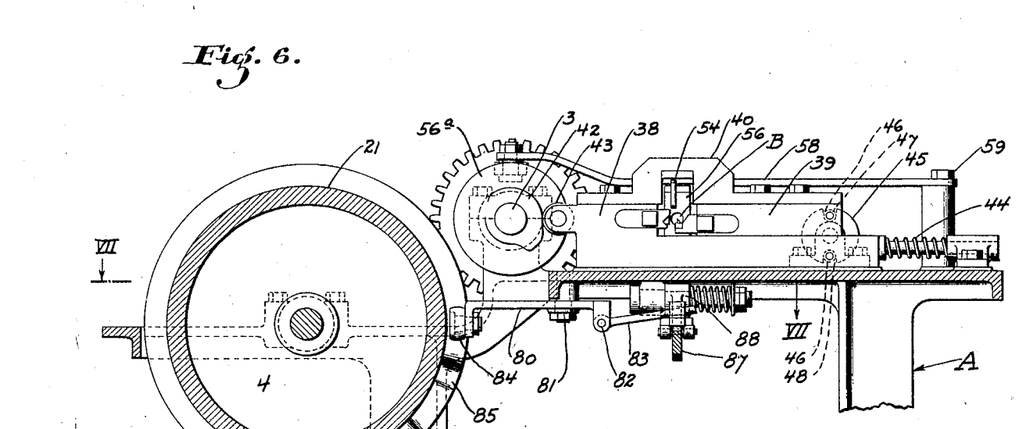
Figure 6 is a longitudinal vertical section taken on the line VI—VI of Figure 1.

The upper end of the lever 83 engages a slide bar 86 (see Figures 3 and 6). This slide bar is supported on a lever 87 which is pivotally attached to a main frame 88. The opposite end of the lever 87 carries a pair of extractor fingers 89 and a pair of bell-cranks 90. The bell-cranks are pivotally connected as at 91 with the slide bar 86 and when the sliding bar is moved through means of the lever 80, the bell-cranks 90 are rocked and the extractor fingers 89 are brought together, thus gripping one end of the completed coil spring. The gripping of the coil spring takes place during the first engagement of the cam 85 with the roller 84. Further engagement of the cam causes additional movement of the lever 80 in the direction of the arrow *a* and the slide bar is, accordingly, moved in the direction of the arrow *b*, (see Figure 3).

The inner end of the slide bar is forked as at 92. The inner shoulder 93 caused by the fork engages the inner end of the lever 87 and this will then be rocked about its pivot 88 in a downward direction or that indicated by the arrow *c* (see Figure 3). The coil spring engaged by the extractor fingers 89 is thus pulled downwardly between the chuck sections, while they are separated or, in other words, positively removed. The spring when pulled away from the chuck and in a downward direction remains gripped by the extractor fingers 89 but these fingers release the spring the moment the cam 85 travels out of engagement with the roller 84.

Figure 7:
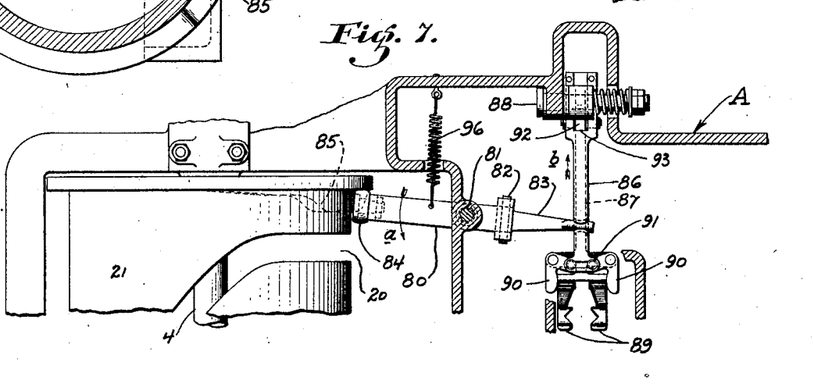
Figure 7 is a plan view in section taken on the line VII—VII of Figure 6, Figures 8, 9, 10 and 11 are enlarged sectional detail views showing different positions assumed by the hook bending mechanism.

The slide bar 86 is, at the same time, returned to normal position and so are the levers 80 and 87, the return of the levers being insured by a tension spring 96 which is attached to the main frame and the lever 80 (see Figure 7). A spring 97 is connected with the lower ends of the extractor fingers 89 and this insures opening of the fingers and the final release of the spring after extraction. The extractor arms are inactive during the first revolution of the shafts 2 and 3 and they also remain inactive during the second revolution, that is, the extractor only comes into action during the last part of the second revolution and completes the final operation of the machine, to-wit, that of positively extracting the assembled completed product.

Having thus described my invention, what I claim and desire to secure by Letters Patent is:—

1. In a machine of the character described, a chuck having a transverse opening formed therein adapted to receive and support a helical coil spring, cutting means disposed on opposite sides of the chuck, means whereby the cutting means is actuated to cut the spring to a predetermined length, means on the cutting means whereby the cut ends of the spring are bent to form hooks, and other means for bending the hooks at right angles to the coils of the spring.

2. In a machine of the character described, a chuck having a transverse opening formed therein adapted to receive and support a helical coil spring, cutting knives disposed on opposite sides of the chuck, means whereby the knives are operated in unison to cut the spring to a predetermined length, shoulders on the knives engageable with the cut ends of the spring and adapted to bend the cut ends to form hooks, and other means co-operating with the cutting knives and adapted to bend the hooks at right angles to the coils of the spring.

3. In a machine of the character described, a chuck having a transverse opening formed therein adapted to receive and support a helical coil spring, cutting knives disposed on opposite sides of the chuck, means whereby the knives are operated in unison to cut the spring to a predetermined length, shoulders on the knives engageable with the cut ends of the spring and adapted to bend the cut ends to form hooks, bending dogs co-operating with the cutting knives, means whereby the dogs are brought into engagement with the spring hooks to bend the hooks at right angles to the coils of the spring, and means whereby the spring is ejected after the last bending operation.

4. In a machine of the character described, a chuck consisting of two separable sections, each section having a transverse groove formed therein to form a transverse opening in the chuck when the chuck sections are brought together, said transverse opening adapted to receive and support a helical coil spring, a pair of cutting knives disposed on one side of the chuck, a second pair of cutting knives disposed on the opposite side of the chuck, means whereby the knives are operated in unison to cut the spring to a predetermined length, shoulders on each pair of cutting knives and engageable with the cut ends of the springs and adapted to bend the cut ends to form hooks, a bending dog co-operating with each pair of knives, means whereby the bending dogs are brought into engagement with the spring hooks formed by the shoulders on the knives to bend the hooks at right angles to the coils in the spring, and means for separating the chuck sections to permit ejection of the spring, after the last named bending operation.

5. A machine of the character described, comprising a main frame, a chuck mounted in the frame, said chuck consisting of two separable sections, the adjoining faces of the chuck having semi-circular grooves formed therein which form a transverse opening through the chuck when the chuck sections are assembled, said transverse opening adapted to receive and support a helical coil spring, a pair of carriages disposed on one side of the chuck, a second pair of carriages disposed on the opposite side of the chuck, cutting knives secured to each pair of carriages, a driving shaft, cams on the driving shaft engageable with each pair of carriages to impart a reciprocal movement thereto so as to reciprocate the cutting knives thereby causing the spring to be cut to a predetermined length, bending shoulders on the knives engageable with the cut ends of the spring during the reciprocal movement of the carriages and adapted to bend the cut ends to form hooks, a second pair of carriages mounted on the frame, a bending dog on each carriage and co-operating with the cutting knives, cams on the driving shaft adapted to impart a reciprocal movement to each last named carriage, means whereby the dogs are brought into engagement with the hooked ends of the springs during the reciprocal movement of the carriages and whereby the hooks are bent at right angles to the coils of the spring, means whereby the chuck sections are separated after the operation of the hook bending dogs, and means whereby the spring is automatically ejected during the separating movement of the chuck sections.

6. A machine for connecting and hooking helical cross springs, comprising a chuck having a transverse opening formed therein adapted to receive and support a helical spring, means whereby the ends of the spring is cut after insertion in the chuck, means whereby the cut ends of the springs are bent to form hooks, other means engageable with the hooks and adapted to bend the hooks at right angles to the coils of the spring, means for rotating the chuck substantially a quarter revolution after the last named bending operation of the hooks, said chuck having a second transverse opening formed therein which intersects the first named opening containing the coil spring delivered thereto, said second named transverse opening adapted to receive a second coil spring which is inserted so as to be threaded through the coils of the first named spring and whereby the two springs are connected, said second named coil spring adapted to be cut and the cut ends adapted to be bent to form hooks by the same mechanism as the first named spring, and means for ejecting the connected springs after the last hook bending operation of the second named spring.

7. A machine of the character described, comprising a main frame, a pair of aligned driving shafts journaled therein, an intermediate shaft, means for driving the driving shafts in unison, means whereby the intermediate shaft is driven at half speed with relation to the driving shafts, a chuck journaled in the machine, said chuck consisting of two separable sections and having two transverse openings formed therein which intersect each other, a cam on the intermediate shaft, means whereby a quarter revolution is transmitted to the chuck once during each half revolution of the cam on the intermediate shaft, a second cam on the intermediate shaft, means whereby movement is transmitted from the cam to separate the chuck sections.

8. A machine of the character described, comprising a main frame, a pair of aligned driving shafts journaled therein, an intermediate shaft, means for driving the driving shafts in unison, means whereby the intermediate shaft is driven at half speed with relation to the driving shafts, a chuck journaled in the machine, said chuck consisting of two separable sections and having two transverse openings formed therein which intersect each other, a cam on the intermediate shaft, means whereby a quarter revolution is transmitted to the chuck once during each half revolution of the cam on the intermediate shaft, a second cam on the intermediate shaft, means whereby movement is transmitted from the cam to separate the chuck sections, and other means for imparting longitudinal movement to the chuck sections in unison.

9. A machine of the character described, comprising a main frame, a pair of aligned driving shafts journaled therein, an intermediate shaft, means for driving the driving shafts in unison, means whereby the intermediate shaft is driven at half speed with relation to the driving shafts, a chuck journaled in the machine, said chuck consisting of two separable sections and having two transverse openings formed therein which intersect each other, a cam on the intermediate shaft, means whereby a quarter revolution is transmitted to the chuck once during each half revolution of the cam on the intermediate shaft, a second cam on the intermediate shaft, means whereby movement is transmitted from the cam to separate the chuck sections, other means for imparting longitudinal movement to the chuck sections in unison, said means comprising a roller journalled on the frame, and a cam face on one of the chuck sections engageable with the roller and adapted to impart longitudinal movement to both chuck sections in unison.

10. A machine of the character described comprising a main frame, a pair of aligned driving shafts journaled therein, an intermediate shaft, means for driving the driving shafts in unison, means whereby the intermediate shaft is driven at half speed with relation to the driving shafts, a chuck journaled in the machine, said chuck consisting of two separable sections and having two transverse openings formed therein which intersect each other, a cam on the intermediate shaft, means whereby a quarter revolution is transmitted to the chuck once during each half revolution of the cam on the intermediate shaft, a second cam on the intermediate shaft, means whereby movement is transmitted from the cam to separate the chuck sections, other means for imparting longitudinal movement to the chuck sections in unison, said means comprising a roller journaled on the frame, a cam face on one of the chuck sections engageable with the roller and adapted to impart longitudinal movement to both chuck sections in unison, a main frame having a feed opening formed therein, through which a helical spring is adapted to be fed, one of the transverse openings in the chuck aligning with the feed opening to receive the helical coil spring when the chuck assumes one position and the other transverse opening in the chuck aligning with the feed opening in the frame to receive a second section of coil spring when the chuck assumes a second position.

11. A machine of the character described comprising a main frame, a pair of aligned driving shafts journaled therein, an intermediate shaft, means whereby the intermediate shaft is driven a half revolution to one revolution of the driving shafts, a chuck mounted in the frame, a carriage mounted on each side thereof, a cutting mechanism carried by each carriage, a cam on each driving shaft and adapted to impart reciprocal movement to the carriages, and the cutting mechanism carried thereby, a second pair of carriages, one on each side of the chuck and disposed at right angles to the first named carriage, a bending dog in each last named carriage, and a cam on each driving shaft whereby a reciprocal movement is transmitted to the last named carriages, and a pivotal movement to the dogs carried thereby.

12. A machine of the character described comprising a main frame, a pair of aligned driving shafts journaled therein, an intermediate shaft, means whereby the intermediate shaft is driven a half revolution to one revolution of the driving shafts, a chuck mounted in the frame, a carriage mounted on each side thereof, a cutting mechanism carried by each carriage, a cam on each driving shaft and adapted to impart reciprocal movement to the carriages, and the cutting mechanism carried thereby, a second pair of carriages, one on each side of the chuck and disposed at right angles to the first named carriage, a bending dog in each last named carriage, a cam on each driving shaft whereby a reciprocal movement is transmitted to the last named carriages, and a pivotal movement to the dogs carried thereby, a shaft supporting the chuck, a cam on the intermediate shaft, and means whereby an oscillating movement slightly less than a quarter revolution is transmitted to said shaft and the chuck from the cam once during each half revolution of the intermediate shaft and cam.

13. In a machine of the character described, the combination with a chuck, of a pair of carriages mounted on one side of the chuck, a second pair of carriages mounted on the opposite side of the chuck, a pair of cutting knives carried by the first named carriages, a second pair of cutting knives carried by the second pair of carriages, and means for imparting a reciprocal and a reverse movement to each pair of carriages and cutting knives.

14. In a machine of the character described, the combination with a chuck, of a pair of carriages mounted on one side of the chuck, a second pair of carriages mounted on the opposite side of the chuck, a pair of cutting knives carried by the first named carriages, a second pair of cutting knives carried by the second pair of carriages, means for imparting a reciprocal and a reverse movement to each pair of carriages and cutting knives, a second pair of carriages disposed at right angles to the first named carriages, means for transmitting reciprocal movement to said last named carriages, a bending dog pivotally mounted on each last named carriage, a cam on each bending dog, and a pair of stationary lugs on the frame, each of the cams on the bending dogs are engageable during the reciprocal movement of the carriages supporting the same, said lugs and cams co-operating to swing the dogs about their pivots.

15. In a machine of the character described, a chuck having a transverse opening formed therein adapted to receive a helical coil spring, a pair of carriages mounted on one side of the chuck, a knife secured to each carriage, means for imparting a reciprocal movement to the carriages in an opposite direction to bring the cutting knives together so as to cut off the end of the coil spring, a shoulder on each knife engageable with the cut off end of the coil spring and adapted to bend the cutoff end to form a hook, a carriage mounted at right angles to the knife supporting carriages, means for imparting a reciprocal movement to the last named carriage, a dog pivotally mounted in said last named carriage, the dog being disposed at right angles to the cutting knives and its forward end overlying the same, a cam on the dog and engageable with the stationary lug on the frame during the reciprocal movement of the carriage, said cam imparting a pivotal downwardly movement to the dog and causing its forward end to engage the hook and to bend it at right angles to the coils of the spring.

16. In a machine of the character described, a chuck adapted to connect a pair of spiral springs so that they will assume a cross position with relation to each other, said chuck consisting of two sections and each section having semi-circular intersecting grooves formed in their adjacent faces, said grooves forming transverse intersecting openings in the chuck when the chuck sections engage each other, a stationary member mounted adjacent the chuck having an opening formed therein through which a helical spring is adapted to be fed, and means for automatically rotating the chuck so that the respective transverse openings formed therein will alternately align with the feed opening to receive the spring sections.

17. In a machine of the character described, a chuck adapted to connect a pair of spiral springs so that they will assume a cross position with relation to each other, said chuck consisting of two sections and each section having semi-circular intersecting grooves formed in their adjacent faces, said grooves forming transverse intersecting openings in the chuck when the chuck sections engage each other, a stationary member mounted adjacent the chuck having an opening formed therein through which a helical spring is adapted to be fed, and means for automatically rotating the chuck so that the respective transverse openings formed therein will alternately align with the feed opening to receive the spring sections, means for cutting off each spring section when delivered to the chuck, and means for separating the chuck sections to permit ejection of the assembled cross springs.

18. In a machine of the class described, the combination with a feed guide means for helically coiled springs, of a chuck having intersecting spring holders, means for actuating said chuck with a step by step movement to alternately bring said holders into operative relation to said feed guide means whereby the springs are interlocked as the second of a pair of springs is fed into its holder, and means for cutting off the ends of the springs and forming hooks thereon while the holders of the chuck are in spring receiving position.

19. In a machine of the class described, the combination with a feed guide means for helically coiled springs, of a chuck having intersecting spring holders, means for actuating said chuck with a step by step movement to alternately bring said holders into operative relation to said feed guide means whereby the springs are interlocked as the second of a pair of springs is fed into its holder, and means for forming hooks on the springs while the holders of the chuck are in spring receiving position.

20. In a machine of the class described, the combination of a rotatably mounted chuck having intersecting spring holders, means for feeding coiled springs thereto, means for rotating the chuck whereby the holders are successively brought to spring receiving position so that a pair of springs are interlocked within the clutch, and means for cutting off the ends and forming hooks on the springs while in the said chuck.

21. In a machine of the class described, the combination of a rotatably mounted chuck having intersecting spring holders, means for feeding coiled springs thereto, means for rotating the chuck whereby the holders are successively brought to spring receiving position so that a pair of springs are interlocked within the clutch, and means for cutting off the springs while in the said chuck.

22. In a machine of the class described, the combination of a chuck having intersecting spring holders, means for rotating the chuck with a step by step movement for positioning said holders, means for successively cutting off the ends of the spring and forming hooks thereon while the holders of said chuck are in spring receiving position, and means for opening the chuck to discharge the work.

GEORGE A. STACKHOUSE.